United States Patent [19]

Meier

[11] 4,393,752

[45] Jul. 19, 1983

[54] PISTON COMPRESSOR

[75] Inventor: Hans Meier, Kollbrunn, Switzerland

[73] Assignee: Sulzer Brothers Limited, Winterthur, Switzerland

[21] Appl. No.: 232,975

[22] Filed: Feb. 9, 1981

[30] Foreign Application Priority Data

Feb. 14, 1980 [CH] Switzerland ................ 1209/80

[51] Int. Cl.³ .................................... F01B 31/00
[52] U.S. Cl. ........................ 92/86; 92/144;
92/171; 92/5 R; 165/169; 165/70; 417/901
[58] Field of Search .......... 92/86, 86.5, 144, 171,
92/186, 5 R; 417/901; 165/70, 169

[56] References Cited

U.S. PATENT DOCUMENTS

| 1,998,264 | 4/1935 | Aikman | 92/144 |
|---|---|---|---|
| 2,078,499 | 4/1937 | Ljungström | 92/144 |
| 2,873,061 | 2/1959 | Kodra | 92/144 |
| 2,931,313 | 4/1960 | Hughes | 417/901 |
| 3,206,110 | 9/1965 | Waibel | 92/144 |
| 3,263,622 | 8/1966 | Tyree, Jr. | 417/901 |
| 3,410,256 | 11/1968 | Herschmann | 92/171 |
| 3,601,384 | 8/1971 | Durdin | 165/169 |
| 3,628,427 | 12/1971 | Bailey | 92/144 |
| 3,659,569 | 5/1972 | Mayer | 92/144 |
| 3,672,263 | 6/1972 | Mirjanic | 92/144 |
| 3,865,015 | 2/1975 | Hakansson | 92/86 |
| 3,972,396 | 8/1976 | Bochnak | 92/86 |

Primary Examiner—Abraham Hershkovitz
Attorney, Agent, or Firm—Kenyon & Kenyon

[57] ABSTRACT

The piston compressor has a cylindrical block with at least one cylinder lining in which a piston moves without making contact. A collecting chamber for leakage gases which escape along the piston is provided at an end of the cylinder liner remote from the compression chamber. The cylinder liner is double walled to form a chamber through which forced coolant can be passed. In addition, an annular space is provided between the cylinder liner and the cylinder block to prevent leaking gas from passing into the cooling water contained in the cylinder block or cylinder liner.

Forced cooling results in a good direct cooling of the cylinder liner.

11 Claims, 4 Drawing Figures

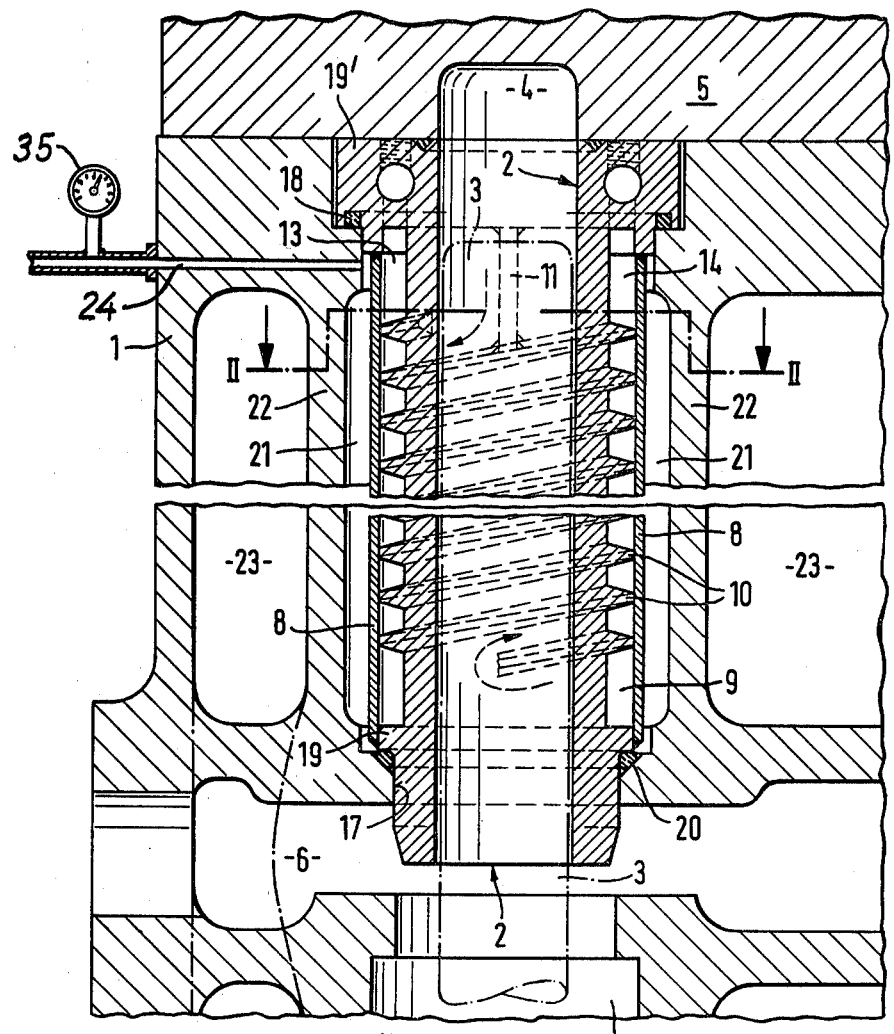
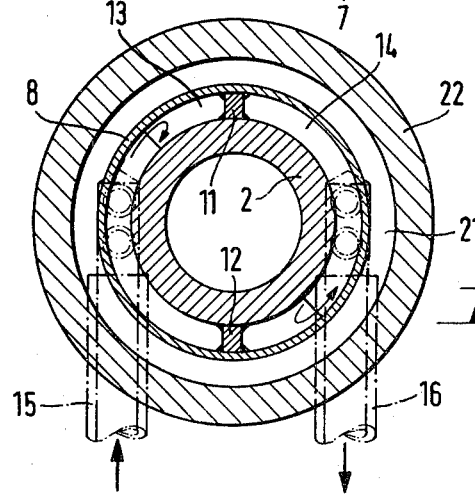
Fig. 1
Fig. 2

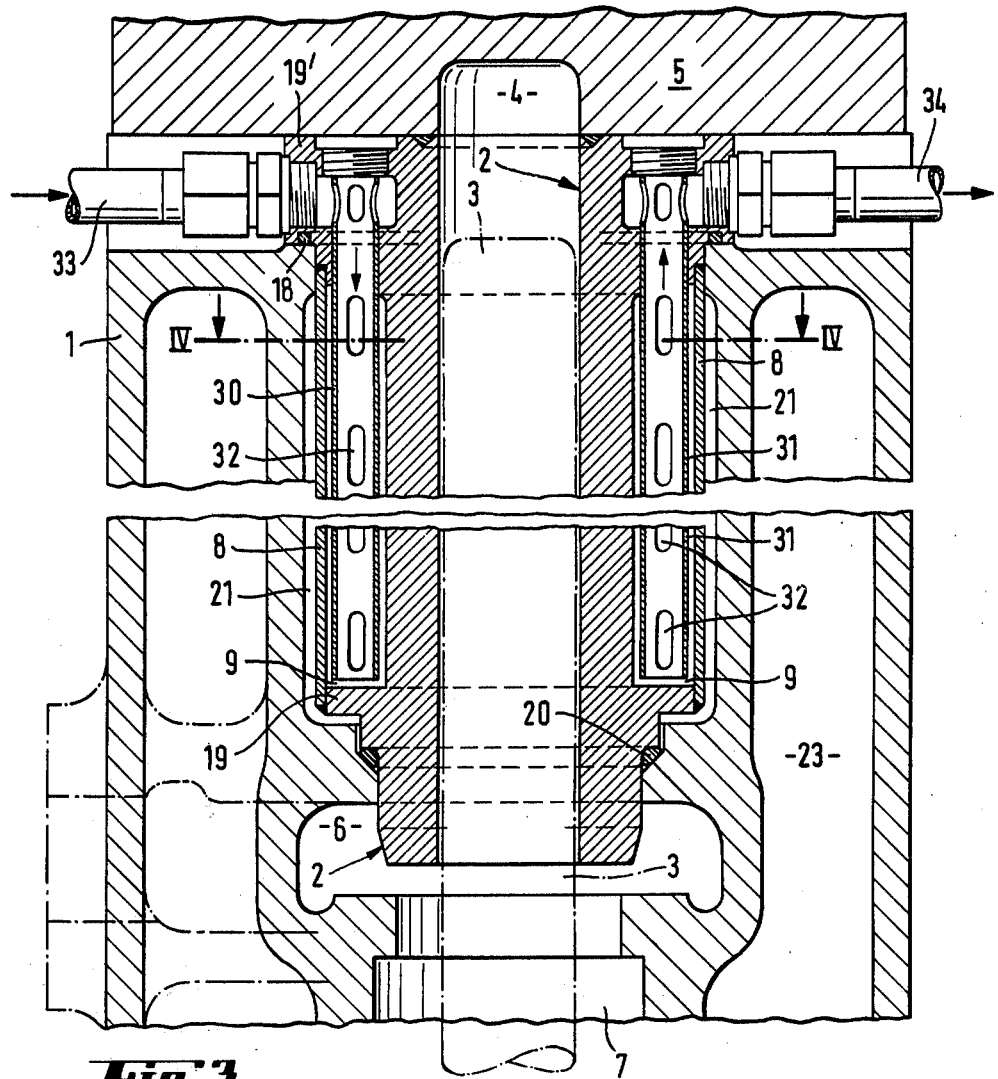
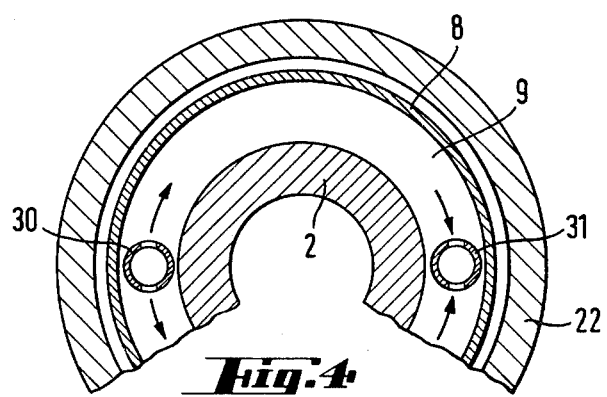

PISTON COMPRESSOR

This invention relates to a piston compressor. More particularly, this invention relates to a piston compressor for compressing combustible or fire-causing gases such as oxygen.

Heretofore, various types of piston compressors have been known for compressing combustible or fire-causing gases such as oxygen. Generally, such compressors have been constructed of a water cooled cylinder block which has at least one cylinder liner sealingly mounted within the block and in which a single-action piston reciprocates. In addition, a collecting chamber is usually provided for leakage gas at the end of the cylinder liner remote from a compression chamber formed within the cylinder block. As is know, cooling water contained in the cylinder block wets the outer surface of the cylinder liner. For this reason, a seal is usually provided between the cylinder block wall and the cylinder liner near the lower end of the cylinder liner. However, this seal constitutes a problem where the piston compressor has a leakage gas collecting chamber as the seal may become defective due to water-side corrosion. Thus, a danger exists that leakage gas may pass from the collecting chamber into a cooling water chamber within the cylinder block. Likewise, a danger exists that water from the cylinder block may pass into the leakage gas collecting chamber. As a result, further corrosion can occur on the cylinder liner as well as on the cylinder block. This, in turn, would greatly reduce the life of the compressor.

Accordingly, it is an object of the invention to reduce the danger of corrosion at the seal of a cylinder liner within a piston compressor.

It is another object of the invention to ensure a good direct cooling of a cylinder liner of a piston compressor.

It is another object of the invention to reduce corrosion within a piston compressor.

It is another object of the invention to prolong the useful life of a piston compressor.

Briefly, the invention provides a piston compressor which is constructed with a cylinder block, a double walled cylinder liner mounted in the cylinder block and a collecting chamber in the cylinder block for receiving leakage gas. The cylinder liner is constructed with a first wall which defines a bore for reciprocation of a piston therein and a second wall annularly spaced from the first wall in order to define an annular chamber therebetween for receiving a coolant. In addition, this second wall is spaced from a wall of the cylinder block in order to define an annular space therebetween. The collecting chamber is disposed in communication with the bore of the cylinder liner to receive leakage gas.

The coolant within the annular chamber may be passed therethrough in a forced-flow manner so as to effect a forced cooling.

The annular space between the liner and the cylinder block separates the liner from any cooling water which is contained in the cylinder block. This annular space starts from a seal located between one end of the cylinder liner and the cylinder block and extends to an opposite end of the liner.

By providing the annular space between the liner and cylinder block, leakage gas which may escape from the collecting chamber is prevented from coming in contact with the coolant forced through the annular chamber within the liner as well as from the coolant in the cylinder block. Thus, the danger of corrosion is eliminated even if the seal at the leakage gas collecting chamber should become defective.

The forced cooling of the double walled cylinder ensures proper removal of the heat of compression and is adapted to the operating conditions despite the presence of the annular space.

Further, the annular space and the cooling water contained in the cylinder block provide good fire protection for the compressor and the surrounding environment should a fire break out in the compression chamber. In such a case, although the cylinder liner may melt through, the cylinder block would not undergo major damage as the annular space would interrupt continued melting. The damage done by such melting may be remedied relatively quickly and at relatively low cost by replacing the cylinder liner rather than replacing or repairing a cylinder block.

The cooling water contained in the cylinder block also helps to maintain the dimensions of the cylinder block essentially constant. This is especially favorable when several cylinders are disposed in the same cylinder block.

In one embodiment, a pair of spirals are disposed between the walls of the cylinder liner to define a helical inflow passage for coolant and a helical outflow passage for the coolant. In this case, a coolant inlet connects with the inflow passage while a coolant outlet connects with the outflow passage.

In another embodiment, a pair of parallel tubes are disposed between the walls of the cylinder liner in diametric relation. Each tube is provided with a plurality of longitudinally spaced apertures while a coolant inlet connects to one tube and a coolant outlet connects to the other tube.

These and other objects and advantages of the invention will become more apparent from the following detailed description taken in conjunction with the accompanying drawings wherein:

FIG. 1 illustrates an axial sectional view through a cylinder block of a piston compressor according to the invention;

FIG. 2 illustrates a view taken on line II—II of FIG. 1;

FIG. 3 illustrates an axial sectional view through a modified cylinder block constructed in accordance with the invention; and FIG. 4 illustrates a view taken on line IV—IV of FIG. 3.

Referring to FIG. 1, a cylinder block 1 of a piston compressor, for example, for compressing oxygen, is provided with at least one cylinder liner 2. The cylinder liner 2 is formed of double walled construction and cooperates with a reciprocal piston 3 and a recess in a cover 5 of the cylinder block to define a compression chamber 4. The piston 3 is provided with labyrinth packings (not shown) to reciprocate, i.e. move up and down as viewed, within the liner 2 without making contact while compression of the oxygen takes place in the compression chamber 4 during upward movement of the piston 3. Inlet and outlet valves to the compression chamber are not shown for simplicity.

A collecting chamber 6 is disposed in the cylinder block for receiving leakage gas. Because of the contactless movement of the piston 3 in the liner 2, during each upward stroke, some gas escapes along the piston 3 and collects as leakage gas in the chamber 6. The leakage gas can be returned from the collecting chamber 6 via a line (not shown) to the suction side of the compressor. As indicated in FIG. 1, a recess 7 in the cylinder block 1 below the cylinder liner 2 can be provided with a seal (not shown) for a piston rod connected to the piston 3 in order to prevent leakage gas from entering the crank space of the compressor.

Referring to FIG. 1, the cylinder liner 2 has a first wall which defines a bore for reciprocation of the piston therein in spaced annular relation. In addition, the liner 2 has a second wall 8 annularly spaced from the first wall in order to define an annular chamber 9 therebetween. As shown, the second wall 8 is formed by a sleeve which is sealingly connected such as by welding at each end to a flange-type thickening 19, 19' at the respective ends of the liner 2. A pair of helical spirals is located between the walls of the cylinder liner 2 in order to define a helical inflow passage for coolant and a helical outflow passage for the coolant. As indicated, the spirals 10 are integral with the inner wall of the liner and abut the sleeve 8.

Suitable means are provided for passing a coolant through the helical passages within the liner 2. To this end, two radial dividing walls 11, 12 are welded into the chamber 9 above the two spirals 10 so that a coolant inlet chamber 13 and a coolant outlet chamber 14 are formed for the coolant. In addition, a coolant inlet communicates the inlet chamber 13 with a coolant feed line 15 (see FIG. 2), while a coolant outlet communicates the chamber 14 with a coolant discharge line 16 (see FIG. 2). As indicated, each of the lines 15, 16 is secured in the flange-like thickening 19' of the cylinder liner 2. During use, a coolant, such as water, is conducted downwardly through the helical inflow passage into the zone of the lower flange-type thickening 19. Thereafter, the coolant stream is conducted upwardly through the other helical passage.

As shown in FIG. 1, the lower end of the cylinder liner 2 extends through a bore 17 of the cylinder block 1 into the collecting chamber 6. In order to seal off this end, a seal ring 20 is inserted at the transition to the lower flange-type thickening 19 of the liner 2. This seal ring 20 is pressed by liner 2 against the cylinder block 1 as the cylinder cover 5 is being clamped on to the cylinder block 1. In like manner, a seal ring 18 is provided in the thickening 19' to seal against the cover 5.

As indicated, the wall 8 is spaced from a wall 22 of the cylinder block 1 to define an annular space 21 therebetween. This annular space extends from above the seal ring 20 to the upper thickening 19' and is connected with a vent line 24 in the cylinder block 1. The cylinder block 1 is also provided with a space 23 through which cooling water may flow.

In operation, compressed oxygen is discharged from the compression chamber 4 via a pressure line (not shown) in the cylinder cover 5. Leakage gas flowing along the piston 3 out of the compression chamber 4 collects in the chamber 6. In the case of an oxygen leak at the seal ring 20, the oxygen cannot come in contact with the cooling water in the space 23 in the cylinder block or the water in the chamber 9 within the liner 2 due to the presence of the air filled space 21. Further, the forced cooling in the chamber 9 of the cylinder liner 2 provides sufficient cooling of the liner 2.

Referring to FIGS. 3 and 4 wherein like reference characters indicate like parts as above, the cylinder liner 2 may be force cooled in another manner. As indicated, a pair of parallel tubes 30, 31 are located between the walls of the cylinder liner 2 in diametric relation and in parallel to the axis of the liner. Each of these tubes 30, 31 has a plurality of longitudinally spaced apertures or slots 32 therein which serve for the passage of coolant. A coolant supply line 33 is threaded into the upper thickening 19' to communicate with the upper of one tube 30 while a similar coolant discharge line 34 is threaded into the thickening 19' to communicate with the outlet end of the other tube 31. Each of these lines 33, 34 serves as an inlet or outlet for the respective tubes 30, 31.

As above, a leakage gas collecting chamber 6 is provided in the zone of the lower end of the cylinder liner 2 through which the piston 3 extends.

During operation, leakage gas from the collecting chamber 6 cannot come in contact via the seal ring 20 with the water from the space 23 or the chamber 9. The forceably conducted coolant, i.e. water, enters the upper end of the tube 30 via the line 33 and disperses through the apertures 32 into the chamber 9 of the double walled cylinder liner 2. These partial streams of coolant each pass over half the circumference of the chamber 9 and then reach the discharge line 34 via the apertures 32 in the tube 31.

Referring to FIG. 1, it is to be noted that a pressure gauge 35 can be connected to the vent line 24 so that the air pressure in the space 21 can be monitored. The pressure gauge could be in active connection with a drive motor of the compressor so that at a pressure which deviates from the normal pressure in the space 21, the drive motor could be automatically stopped. This would be especially useful upon occurrence of a fire in the cylinder chamber. In addition to or instead of turning off the drive motor, a relief device may be connected to the compression chamber 4 in order to be actuated as a function of the pressure in the space 21.

Alternatively, the space 21 may be filled with an inert gas such as nitrogen so that the operation of the packings can be monitored, for example by a control of nitrogen pressure and/or composition of the gas in the space 21.

It is further noted that the coolant supply lines 15, 33 may be provided with valves so as to adapt the quantities of coolant traversing the chamber 9 to the operating conditions of the compressor.

With respect to FIG. 1, it is noted that the spirals 10 may be separate structural parts which can be welded or otherwise secured to the liner walls or may be formed by buildup welding.

The fire causing gas which is compressed in the compressor may also be of other types than oxygen e.g. chlorine.

Finally, it is noted that the coolant in the chamber 9 and the space 23 may come from the same source, may be of the same kind but of different quality or grade, or may be of different kind.

The invention thus provides a piston compressor wherein leakage of gas into the coolant passageways or chambers of the compressor are avoided.

What is claimed is:

1. A piston compressor comprising a cylinder block; a double walled cylinder liner mounted in said cylinder block, said cylinder liner having a first wall defining a bore for reciprocation of a piston therein and a second wall annularly spaced from said first wall to define an annular chamber therebetween for receiving a coolant, said second wall being spaced from a wall of said cylinder block to define an annular space therebetween;

a collecting chamber in said cylinder block for receiving leakage gas, said collecting chamber being in communication with said bore of said cylinder liner;

a vent line in said block communicating with said annular space; and a pressure gauge connected to said vent line.

2. A piston compressor comprising a cylinder block having a recess therein;

a double walled cylinder liner sealingly mounted in said cylinder block, said cylinder liner having a first wall defining a bore coaxial of said recess to define a compression chamber therewith and a second wall spaced from said first wall to define an annular chamber therebetween, said second wall being spaced from a wall of said cylinder block to define an annular space therebetween sealed from said annular chamber;

a piston reciprocally mounted in said bore of said cylinder liner;

a collecting chamber in said cylinder block remote from said compression chamber for receiving leakage gas from between said piston and said first wall of said cylinder liner; and means for passing a coolant through said annular chamber of said cylinder liner.

3. A piston compressor as set forth in claim 2 wherein said cylinder liner includes a pair of longitudinally spaced flange-type thickenings and a sleeve sealingly connected at each end to a respective thickening to define said second wall.

4. A piston compressor as set forth in claim 2 which further comprises a pair of spirals between said walls of said cylinder liner to define a helical inflow passage for coolant and a helical outflow passage for coolant, a coolant inlet to said inflow passage and a coolant outlet from said outflow passage.

5. A piston compressor as set forth in claim 4 wherein said spirals are integral with said one wall and abut said second wall.

6. A piston compressor as set forth in claim 2 which further comprises a pair of parallel tubes between said walls of said cylinder liner in diametric relation, each tube having a plurality of longitudinally spaced apertures therein, a coolant inlet connected to one of said tubes and a coolant outlet connected to the other of said tubes.

7. A piston compressor as set forth in claim 2 which further comprises a vent line in said block communicating with said annular space.

8. A piston compressor as set forth in claim 7 which further comprises a pressure gauge connected to said vent line.

9. A piston compressor as set forth in claim 2 wherein said annular space is filled with an inert gas.

10. A piston compressor as set forth in claim 2 wherein said cylinder block includes a space surrounding said annular space and filled with a liquid coolant.

11. A piston compressor comprising a cylinder block; a double walled cylinder liner mounted in said cylinder block, said cylinder liner having a first wall defining a bore for reciprocation of a piston therein and a second wall annularly spaced from said first wall to define an annular chamber therebetween for receiving a coolant, said second wall being spaced from a wall of said cylinder block to define an annular space therebetween filled with an inert gas;

a collecting chamber in said cylinder block for receiving leakage gas, said collecting chamber being in communication with said bore of said cylinder liner;

a vent line in said block communicating with said annular space; and a pressure gauge connected to said vent line.

* * * * *

UNITED STATES PATENT AND TRADEMARK OFFICE
CERTIFICATE OF CORRECTION

PATENT NO. : 4,393,752

DATED : July 19, 1983

INVENTOR(S) : Hans Meier

It is certified that error appears in the above—identified patent and that said Letters Patent is hereby corrected as shown below:

Column 1, line 17, change "know" to --known--

Signed and Sealed this

Fourth Day of October 1983

[SEAL]

Attest:

GERALD J. MOSSINGHOFF

Attesting Officer

Commissioner of Patents and Trademarks